(12) United States Patent
Jones et al.

(10) Patent No.: US 7,300,152 B2
(45) Date of Patent: Nov. 27, 2007

(54) CONTACT LENSES AND METHODS FOR THEIR DESIGN

(75) Inventors: Larry G. Jones, Jacksonville, FL (US); James W. Haywood, Orange Park, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 11/132,999

(22) Filed: May 19, 2005

(65) Prior Publication Data

US 2005/0275801 A1    Dec. 15, 2005

(51) Int. Cl.
    *G02C 7/04*    (2006.01)
(52) U.S. Cl. .................. 351/160 R; 351/177
(58) Field of Classification Search ............ 351/160 R, 351/161, 162, 160 H, 177
    See application file for complete search history.

(56) References Cited

U.S. PATENT DOCUMENTS 5,872,613 A *  2/1999  Blum et al. .................. 351/177
6,082,856 A    7/2000  Dunn et al.
6,116,735 A    9/2000  Wada et al.

FOREIGN PATENT DOCUMENTS

| DE | 102 41210 | 3/2004 |
|----|-----------|--------|
| EP | 0 560 999 | 9/1993 |
| EP | 0 949 528 | 10/1999 |
| EP | 1 331 505 | 7/2003 |

OTHER PUBLICATIONS

PCT International Search Report, dated Sep. 22, 2005, for PCT Int'l. Appln. No. PCT/US2005/020747.

* cited by examiner

*Primary Examiner*—Scott J. Sugarman
*Assistant Examiner*—Darryl J. Collins
(74) *Attorney, Agent, or Firm*—Lois A. Gianneschi

(57) ABSTRACT

The invention provides lenses that are designed by taking into account one or more of pupil size, field, and decentration.

13 Claims, 4 Drawing Sheets

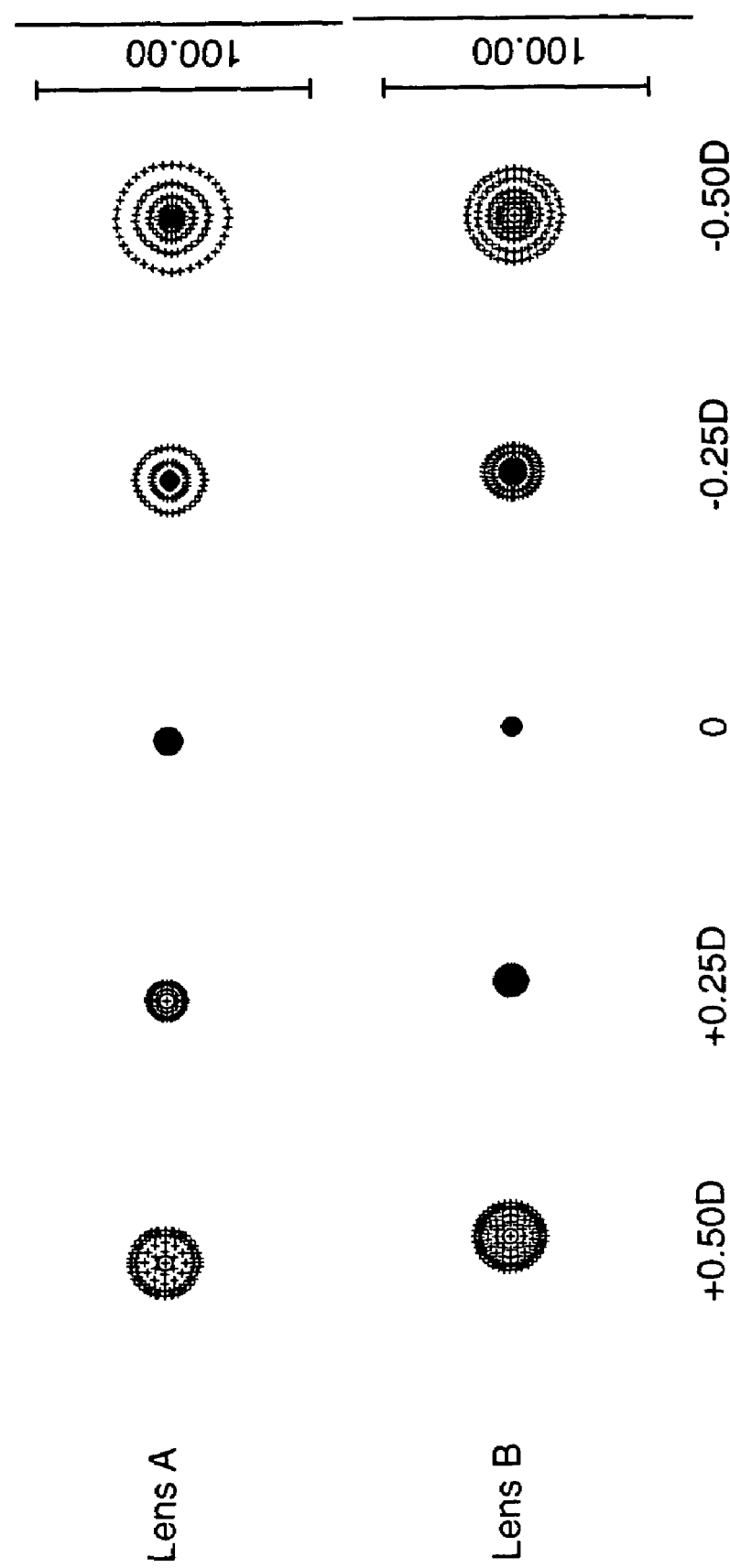

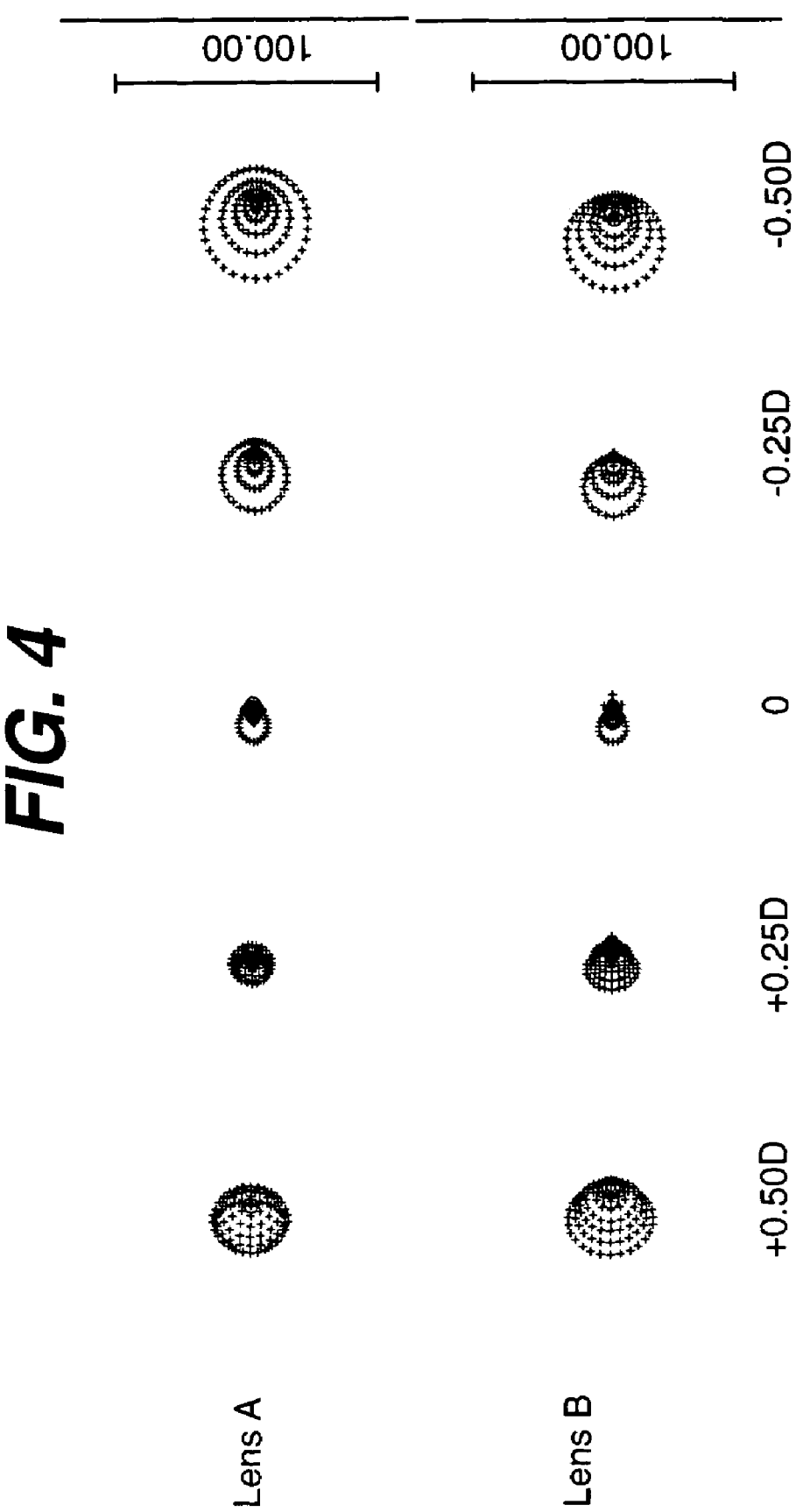

CONTACT LENSES AND METHODS FOR THEIR DESIGN

FIELD OF THE INVENTION

The invention relates to contact lenses. In particular, the invention provides contact lenses designed by taking into account the effects of field and decentration when the lens is on-eye.

BACKGROUND OF THE INVENTION

The use of soft contact lenses for correction of visual acuity defects is widely accepted. Typically, soft contact lenses are designed in air using simple, paraxial modeling. This method of lens design fails to take into account the effects of field and decentration when the contact lens wraps on the cornea resulting in suboptimal lens performance. Therefore, a need exists for contact lenses and method of lens design that improve lens performance

BRIEF DESCRIPTION OF THE DRAWINGS

FIG. 3 is a chart of the on-axis spot comparison of the lenses of the example.

FIG. 4 is a chart of the off-axis spot comparison of the lenses of the example.

DETAILED DESCRIPTION OF THE INVENTION AND PREFERRED EMBODIMENTS

Figure 1:
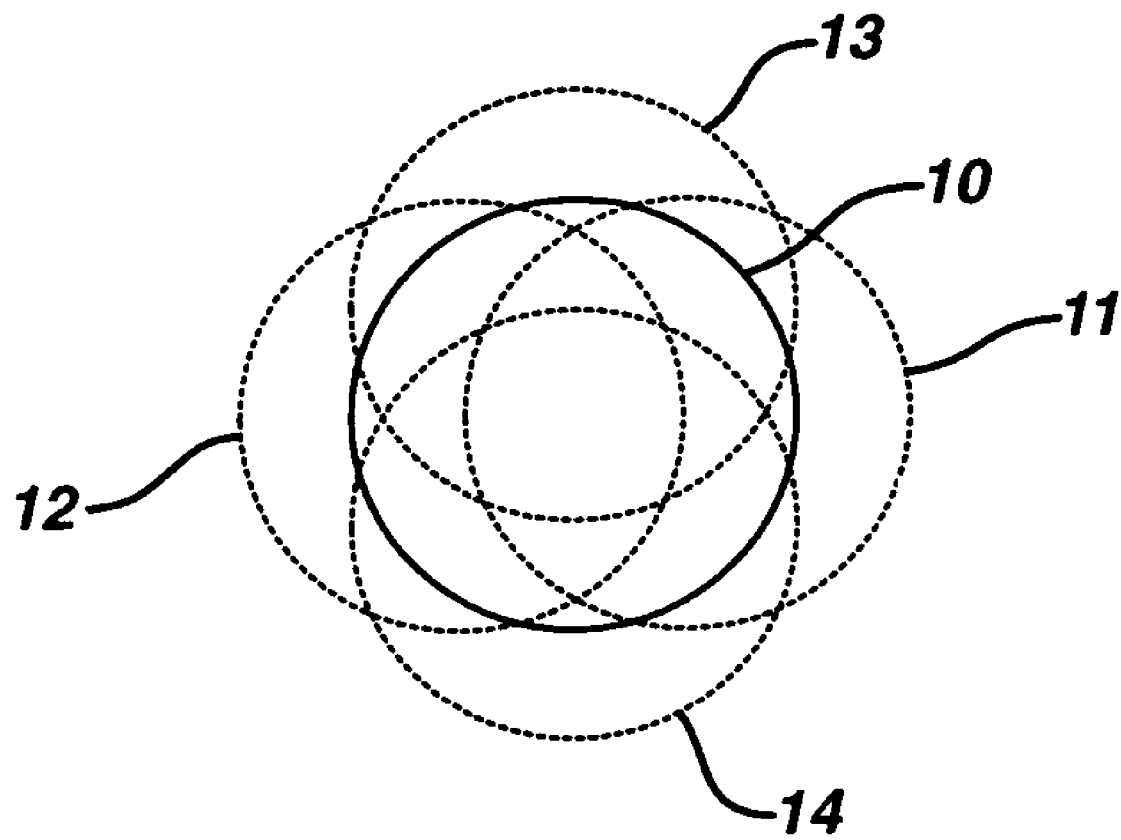
FIG. 1 is a depiction of decentration locations used in one embodiment of the design method of the invention.

The invention provides lenses, and methods for their production, that are designed by taking into account one or more of pupil size, field, and decentration. It is a discovery of the invention that, by taking these factors into account in lens design, a near diffraction limited contact lens can be designed, which lens has performance when off-axis, or decentered, that is superior to conventional soft contact lenses. By "near diffraction limited" is meant that the on-axis, centered performance of the lens is greater than about 80% of the diffraction limit of the lens plus eye.

Additionally, the monofocal lenses of the invention provide performance that minimizes the wearer's normally required optical cylinder without the need to include toricity in the lens due to the sharper image provided by the lens, which compensates for some of the blurring of image due to the wearer's cylinder. As yet another advantage, the lenses of the invention can be used to provide accommodation for near and intermediate distance tasks for emerging presbyopes. More specifically, the lenses of the invention may be useful for correcting near vision acuity of individuals who need less than about 1.75 diopters, preferably less than or equal to about 1.5 diopters of add power.

In one embodiment, the invention provides a soft contact lens comprising, consisting essentially of, and consisting of a back surface having a shape suitable to substantially inversely match a corneal shape and an aspheric front surface, wherein the lens' optical performance for one or more of pupil size, field, and lens centration is optimized. In another embodiment, the invention provides a method of designing a soft contact lens comprising, consisting essentially of and consisting of the steps of shaping a back surface of a lens to substantially inversely match a corneal shape, providing an aspheric front surface and optimizing the optical performance of the front surface of the lens for one or more of pupil size, field, and lens centration.

By "substantially inversely match" is meant that the back surface of the lens is substantially superimposable over the topography of the cornea. By "field" is meant a line of sight that enters the lens at an angle.

The front surface of the lens of the invention is an aspheric surface. Conventional aspheric lens surfaces are designed by providing a spherical surface and then adding a conic constant to the sag equation for the surface. In the lens of the invention, preferably the aspheric surface is provided by taking a spherical surface and adding a conic constant to the sag equation along with a third or higher, preferably third to eight, numbered term in the power function. Alternately, the lens may be provided by describing it as a rotation about the optical axis of a decentered conic or odd asphere.

In either method of describing the surface, the parameters to be varied in the design of the lens are the amount of decentration, the conic constant, the radius and the power terms. The spherical term, conic constant and higher order terms may be optimized using an appropriate merit function in an optical code design. Suitable optical design software is commercially available and includes, without limitation, ZEMAX™, CODE V™, OSLO™, and the like. One ordinarily skilled in the art will recognize that the merit function will vary depending on the lens design code used and the optical parameters of the contact lens including, without limitation, refractive index and constraints on the lens thickness.

The conic constant, aspheric values and power function used will vary depending on the prescription of the lens wearer and the design optimization preferences. However, a preferred range for the conic constant is −12.00 to about −3.00.

In one embodiment of the lens of the invention, the radius, conic constant, and aspheric terms are described according to the following equation:

$$Z = \frac{CY^2}{1+\sqrt{1-(1+K)C^2Y^2}} + \alpha_1 + \alpha_2 Y^2 + \alpha_3 Y^3 + \alpha_4 Y^4 + \ldots \quad (1)$$

wherein Z is the sag of the surface;
C is the curvature of the surface, which curvature is one divided by the radius of the surface or $$C = \frac{1}{R};$$

Y is the distance from the surface's geometric center;
K is the conic constant; and
$\alpha$ is an aspheric term.

In this embodiment, $\alpha$ terms of third through the eighth power are used. For a 3.5 diopter embodiment of this design, the values are as follows:
R=8.578046 mm;
K=−5.708632;
$\alpha_1$=0;
$\alpha_2$=0;
$\alpha_3$=5.583403E-3;
$\alpha_4$=−6.85069E-3;
$\alpha_5$=6.107366E-3;
$\alpha_6$=−2.68785E-3;

$\alpha_7 = 6.087638E-4$; and
$\alpha_8 = -5.56538E-5$.

The back curve, or back surface, of the lenses of the invention substantially inversely corresponds to a corneal shape. Preferably, the surface substantially inversely corresponds to an average corneal shape of a population of individuals. This back surface may be designed by any convenient method. By way of example, a standard corneal shape that is a population average corneal shape may be developed using a library of corneal topographies for a population. Suitable information relating to population corneal shapes are available from any number of sources including, without limitation, Atchison, David A. and George Smith, "Optics of the Human Eye", Butter-Heinemann, pp 15-18 (2000). Alternatively, the corneal shape of an individual's cornea may be used, which shape may be determined using any suitable corneal shape measuring device including, without limitation, a KERATRON™ device. The population average or individual corneal profile may be described mathematically including, without limitation, by the use of Zernike coefficients, polynomial power terms, Taylor series, Fourier series, conics, and the like. As yet another alternative, a corneal shape having radius of about 7.85 mm with a conic constant of −0.260 may be used, which values are derived from known measured values and represent the nominal values of a typical eye.

The resulting lens is then optimized by any suitable method, as for example, by a ray tracing program such as ZEMAX for performance in a plurality of fields. Preferably, the surface is optimized using centered and decentered fields. FIG. 1 depicts a centered lens and the decentration fields used for the above-described embodiment. The centered, on axis lens 10 at 0 degrees is shown along with decentration 11 at +0.5 mm horizontal, decentration 12 at −0.5 mm horizontal, decentration 13 at +0.5 mm vertical and decentration 14 at −0.5 mm horizontal. Although an infinite number of configurations in any number of directions may be used, preferably, the lens is optimized centered relative to a pupil and at eight decentered configurations. The decentered values may be chosen to represent assumed random decentering of the lens on the eye with no decentration preference in any direction. Preferably, no less than four directions for decentration optimization are used, which directions are up, relative to the lens' center point and along the 90 degree axis, down along the 270 degree axis, left along the 180 degree axis and right along the 0 degree axis.

The lens may be further optimized for different pupil sizes. Any number of pupil sizes may be used. Preferably, two pupil sizes, 3 and 5 mm respectively, are used, which sizes approximate population averages for low and high illumination lighting conditions. Because pupil size varies with illumination, at larger pupil sizes resulting from low illumination conditions, more aberrations will be experienced by the lens wearer. Also, typically spot size increases with pupil size in the human eye. Thus, by optimizing for more than one pupil size, lens performance may be improved. The pupil sizes 3 and 5 mm were used with the above-described decentration embodiments, shown in FIG. 1, for a total of 10 configurations, each with 5 fields. Using these 10 configurations, the front surface shape parameters were varied by the ray tracing program to optimize the lens-eye system using the defined merit function, which was Modulation Transfer Function ("MTF") at 50 and 100 cycles for all fields and configurations. By optimizing for both centered and decentered conditions and fields, aberrations introduced into the image by lens decentering and fields may be reduced.

One ordinarily skilled in the art will recognize that the optimization of the lens surface may be carried out using computer modeling using an eye model and a ray trace program. Preferably, the eye model used is a model that represents the $5^{th}$ and $95^{th}$ percentile eyes in addition to the average eye. Suitable ray trace programs include, without limitation, those found in ZEMAX, CODE V, OSLO, and the like.

Figure 2:
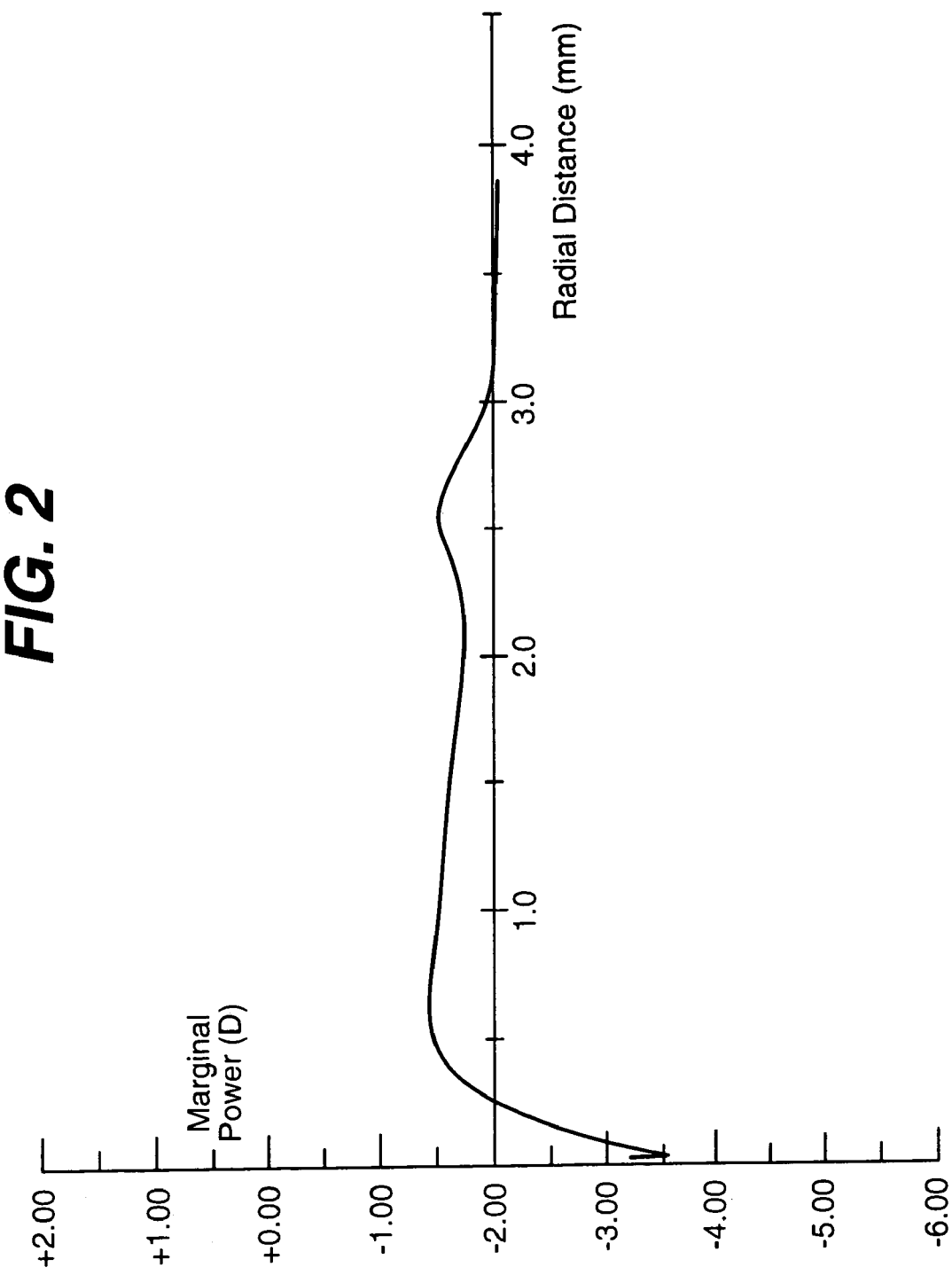
FIG. 2 is a power curve for a lens of the invention.

A merit function may be used for each value of pupil size and centration and decentration. One ordinarily skilled in the art will recognize that the merit function selected will be determined based on the desired lens design. Merit functions that optimize optical performance criteria such as spot size, MTF, OTF, Strehl Ratio, encircled energy, RMS wavefront error, and the like and combinations thereof also may be used. FIG. 2 depicts the power curve for a contact lens designed for 3 and 5 mm pupils and accounting for fields of 0 degrees and ±5 degrees in X and Y and 0.5 mm decentration in X and Y using the design approach of the invention. The plot is an average of several designs from piano to minus 3.5 diopters.

As an example of how optimization may be carried out, an eye model is selected and the distance from the back of the eye lens to the retina in the model is modified to represent a particular prescription. A spherical surface, representing the anterior surface of a contact lens is added to the eye model, and the surface is modified to an aspheric surface, like the surface represented by Equation I. Various object fields are added to the model and multiple configurations are then set that represent different, selected pupil sizes and lens decentrations. A merit function is generated representing the performance of the lens-eye model combination at the various fields and configurations. The parameters of the lens surface are changed to variables and the optimization routine in the optical design program is initiated to minimize the merit function improving optical performance of the lens-eye model.

The lens of the invention provides performance for off-axis object points when the lens is decentered that is superior to conventional soft contact lenses. Additionally, the lenses of the invention provide some correction for the wearer's optical cylinder that minimizes or substantially eliminates the need to include optical cylinder correction for the lens wearer.

The lenses of the invention may be made from any suitable lens forming material for manufacturing hard or soft contact lenses. Illustrative materials for formation of soft contact lenses include, without limitation, silicone elastomers, silicone-containing macromers including, without limitation, those disclosed in U.S. Pat. Nos. 5,371,147, 5,314,960, and 5,057,578 incorporated in their entireties by reference, hydrogels, silicone-containing hydrogels, and the like and combinations thereof. More preferably, the surface is a siloxane, or contains a siloxane functionality including, without limitation, polydimethyl siloxane macromers, methacryloxypropyl siloxanes, and mixtures thereof, silicone hydrogel or a hydrogel. Illustrative materials include, without limitation, acquafilcon, etafilcon, genfilcon, lenefilcon, senefilcon, balafilcon, lotrafilcon, or galyfilcon.

Curing of the lens material may be carried out by any convenient method. For example, the material may be deposited within a mold and cured by thermal, irradiation, chemical, electromagnetic radiation curing and the like and combinations thereof. Preferably, molding is carried out using ultraviolet light or using the full spectrum of visible light. More specifically, the precise conditions suitable for curing the lens material will depend on the material selected and the lens to be formed. Suitable processes are disclosed in U.S. Pat. Nos. 4,495,313, 4,680,336, 4,889,664, 5,039,459, and 5,540,410 incorporated herein in their entireties by reference.

The contact lenses of the invention may be formed by any convenient method. One such method uses a lathe to produce mold inserts. The mold inserts in turn are used to form molds. Subsequently, a suitable lens material is placed between the molds followed by compression and curing of the resin to form the lenses of the invention. One ordinarily skilled in the art will recognize that any other number of known methods may be used to produce the lenses of the invention.

The invention will be clarified further by a consideration of the following, non-limiting examples.

EXAMPLE

The performance of a lens designed according to the method of the invention and a lens designed using a paraxial optical design method in air were compared. The paraxial design, Lens A, was an ACUVUE® 2 BRAND etafilcon lens of −3.00 diopters. The Lens A design was wrapped onto a nominal cornea using Finite, Element Analysis ("FEA") techniques. The lens shape resulting from the FEA was then loaded into the ZEMAX optical ray trace program.

FIGS. 3 and 4 are charts below comparing the 0 and 5 degree field RMS spot size at up to ±−0.5 diopters from the central design point of the wrapped Lens A design to a lens design of the invention, Lens B. Lens B is a −3.00 diopters etafilcon lens. The merit function used for Lens B was the RMS spot size at focus, with a ±5 degree field and a 0.5 mm decentration in ±X and ±Y directions. At these decentered conditions, the fields were optimized for RMS spot size at a 0 degree field and at ±5 degrees fields in X and Y. The total number of configurations used was 10 and all conditions were at 2.5 and 4.5 mm apparent pupils.

FIGS. 3 and 4 show that the design of the invention had a superior, or smaller, RMS spot size at a 4 mm apparent pupil for up to 0.5 diopters from the design point as compared to Lens A.

What is claimed is:

1. A soft contact lens, comprising a back surface having a shape suitable to substantially inversely match a corneal shape having radius of about 7.85 mm and a conic constant of −0.260 and an aspheric front surface, wherein the lens' optical performance for one or more of pupil size, field, and lens centration is optimized.

2. A soft contact lens, comprising a back surface having a shape suitable to substantially inversely match a corneal shape having radius of about 7.85 mm and a conic constant of −0.260 and an aspheric front surface, wherein the lens' optical performance for each of pupil size, field, and lens centration is optimized.

3. A soft contact lens, comprising a back surface having a shape suitable to substantially inversely match a corneal shape having radius of about 7.85 mm and a conic constant of −0.260 and an aspheric front surface, wherein the lens' optical performance for one or more of pupil size, field, and lens centration is optimized and wherein the lens provides a correction of a near vision acuity of less than about 1.75 diopters.

4. A soft contact lens, comprising a back surface having a shape suitable to substantially inversely match a corneal shape having radius of about 7.85 mm and a conic constant of −0.260 and an aspheric front surface, wherein the lens' optical performance for each of pupil size, field, and lens centration is optimized and wherein the lens provides a correction of a near vision acuity of less than about 1.75 diopters.

5. A method for designing a soft contact lens, comprising the steps of shaping a back surface of a lens to substantially inversely correspond to a corneal shape, providing an aspheric front surface wherein the aspheric surface is provided by taking a spherical surface and adding a conic constant to a sag equation along with a third or higher numbered term in a power function, and optimizing an optical performance of the front surface for one or more of pupil size, field, and lens centration.

6. A method for designing a soft contact lens, comprising the steps of shaping a back surface of a lens to substantially inversely correspond to a corneal shape, providing an aspheric front surface wherein the aspheric surface is provided by taking a spherical surface and adding a conic constant to a sag equation along with a third or higher numbered term in a power function, and optimizing an optical performance of the front surface for pupil size, field, and lens centration.

7. The method of claim 5 or 6, wherein the aspheric surface is provided by taking a spherical surface and adding a conic constant to a sag equation along with a third to eight numbered term in a power function.

8. The method of claim 6, wherein the conic constant is −12.00 to about −3.00.

9. The method of claim 6, wherein optimizing the optical performance of the lens centration is carried out using a lens centered relative to a pupil and a plurality of decentered values relative to the pupil.

10. The method of claim 9, wherein the optimizing further comprises optimizing for a plurality of pupil sizes.

11. The method of claim 9, wherein the optimizing further comprises optimizing for pupil sizes of 3 and 5 mm.

12. The method of claim 6, wherein optimizing is carried out using a lens centered relative to a pupil and between 4 and 8 decentered values relative to the pupil.

13. The method of claim 6, wherein optimizing the optical performance of the field is carried out using a plurality of fields.

* * * * *